Patented Nov. 26, 1940

2,223,244

UNITED STATES PATENT OFFICE 2,223,244

MANUFACTURE OF STABILIZED ANIMAL AND VEGETABLE FATS AND OILS

Erich Böhm and Theodor Sabalitschka, Berlin, Germany

No Drawing. Application December 23, 1937, Serial No. 181,456. In Germany June 23, 1937

7 Claims. (Cl. 23—250)

In the stabilization of products subject to deterioration by oxidation, the process which comprises adding to such a product a small amount of a compound represented by the general formula

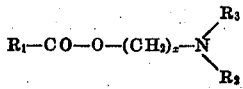

This invention relates to manufacture of stabilized animal and vegetable fats and oils; and it comprises a process of stabilizing various materials, such as oils, animal and vegetable fats and oils which are subject to deterioration by oxidation, wherein small amounts of certain aminoalkyl esters of carboxylic acids are added to the products to be stabilized; and it also includes the stabilized products thereby produced, these products being mono- or di-alkylated-amino compounds having the general formula

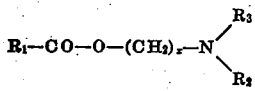

wherein $R_1$ represents hydrogen, an alkyl, an alkylene or an aryl group which may be substituted by hydroxyl, alkoxy, alkyl or amino groups, $R_2$ represents an alkyl group containing no more than 3 carbon atoms, $R_3$ represents hydrogen or an alkyl group having no more than 3 carbon atoms and $x$ is an integer varying from 1 to 4; all as more fully hereinafter set forth and as claimed.

A large number of animal and vegetable oils and fats, as well as ethereal oils, and commercial products containing the same are subject to deterioration by oxidation. Many efforts have been made to stabilize these products and a large number of so-called anti-oxidants have been discovered which, when added to certain of these products tend to produce stabilization. The great majority of the anti-oxidants which have been proposed in this art, however, are not suitable for use in the preservation of oleaginous foodstuffs. Examples of compounds which have been recommended as anti-oxidants include amino-acids, unsaturated poly-basic aliphatic acids, aryl amines, alkylol-amines, phenols, the phenyl-phenolates of certain amines, etc. Certain of these compounds, if added to food products, would cause these products to darken, certain would alter the taste or odor of food products, many are poisonous or at least injurious to health, while several tend to increase the oxidation of certain products upon change in concentration or upon exposure to light. There has thus been an important demand for new anti-oxidants which are suitable for use in stabilizing food products. The present invention affords at least a partial solution of this problem since several of the anti-oxidants which are used in the processes of the present invention can be employed in foodstuffs.

It has been found that certain aminoalkyl esters of carboxylic acids have the property of stabilizing animal and vegetable fats and oils which are subject to oxidation, when added thereto in minutes quantities. These products fall within a well defined group having a general formula corresponding to the following:

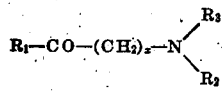

wherein $R_1$ represents a substituent selected from the class consisting of hydrogen, alkyl, alkylene, aryl, hydroxyaryl, alkoxyaryl and aminoaryl groups, $R_2$ represents an alkyl group containing no more than 3 carbon atoms, $R_3$ represents a substituent selected from the class consisting of hydrogen and alkyl groups having no more than 3 carbon atoms, and $x$ is an integer varying from 1 to 4. The structure of $R_1$ appears to be of less importance than the structure of the rest of the molecule since this substituent can be varied widely, for example from hydrogen to naphthyl. $R_1$ may even represent a heterocyclic group, such as pyridyl, and it is therefore evident that the term "aryl" as used above and in the following claims is to be interpreted as covering both carbocyclic and heterocyclic groups. All methyl-, ethyl-, propyl- and butyl-amino esters of carboxylic acids containing the group

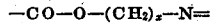

appear to act as anti-oxidants in the processes of the present invention.

Complete stabilization is usually obtained by the addition of minute quantities of anti-oxidant, within the range of about 0.02 to 0.1 per cent by weight, although some products have been found to require an addition of up to 1 per cent for complete stabilization.

Animal and vegetable fats and oils which are subject to oxidation when exposed to the air, can be stabilized by the above defined products. Examples of products which can be thus stabilized include vegetable and animal oils and fats, ethereal oils and ether, the so-called fatty oils, and emulsions of these materials.

To determine the efficacy of the anti-oxidants which are used in the present invention, the following tests may be cited, in which arachis and linseed oil were stabilized by adding thereto various percentages of the anti-oxidant compound $C_2H_5$—CO—O—$(CH_2)_3$—$N(C_2H_5)_2$. The extent of oxidation of these oils was estimated by determining their peroxide content by use of a standard method, it being well recognized that the autoxidation of fats results in the production of peroxides. Five samples of each of the oils were introduced into low, open containers in a thin layer, in order to expose a large surface of the oils to the air. One sample of each oil was left untreated, while to the other samples there were added various percentages of the above anti-oxidant, varying from 0.05 to 0.25 per cent by weight. The containers were then placed in an oven in the dark and allowed to stand for 10 days at a temperature of 42° C., after which the peroxide contents of the oil samples were determined. This was accomplished by taking 0.5 cc. samples from the containers, dissolving each of these in 10 cc. of a mixture of 2 parts glacial acetic acid and 1 part of chloroform. To each of these solutions there was added 1 cc. of a saturated aqueous solution of potassium iodide, after which the solutions were placed in the dark for 3 minutes. Then 10 cc. of water were added to each solution and the free iodine was titrated with N/500 sodium thiosulphate solution. The results obtained are listed in the following table:

| Concentration of anti-oxidant added, percent | Arachis oil (thiosulfate consumed) | Linseed oil (thiosulfate consumed) |
| --- | --- | --- |
| 0.00 | 6.6 cm.³ | 23.2 cm.³ |
| 0.05 | 3.3 | |
| 0.10 | 3.0 | 9.0 |
| 0.15 | 2.3 | 8.0 |
| 0.20 | 2.2 | 6.7 |
| 0.25 | | 6.3 |

The thiosulfate consumed by the untreated arachis oil and the untreated linseed were determined just before the above tests were made and found to be 2.3 cc. and 6.3 cc., respectively. It is thus seen that the thiosulfate consumed by the untreated samples increased from these values to 6.6 cc. and 23.2 cc., respectively. In contrast to this the above table shows that the arachis oil was completely stabilized by the addition of only 0.15 per cent of the anti-oxidant, while the linseed oil was completely stabilized by the addition of 0.25 per cent of the anti-oxidant. It is also seen that the addition of only 0.05 per cent of the anti-oxidant to the arachis oil reduced the oxidation by 77 per cent, while the addition of 0.1 per cent to the linseed oil reduced its oxidation by 84 per cent.

In another experiment it was found that the addition of 0.2 per cent of the anti-oxidant $C_3H_7$—CO—O—$(CH_2)_2$—$N(CH_3)_2$ to linseed oil produced substantially complete stability of this product. A treated sample of linseed oil remained liquid during a storage period of 5 months at room temperatures in an open container, whereas an untreated sample, tested under the same conditions, became completely hardened. This represents a practical test for the stability of linseed oil.

The following specific examples illustrate several different methods by which it is possible to produce the antioxidants used in the present invention, as well as showing how those anti-oxidants can be employed practically in the stabilization of certain products in accordance with the present invention.

Example 1

600 grams of propionyl chloride were dissolved in 2½ liters of chloroform. This solution was placed in a flask and, while cooling the flask, 650 grams of gamma-diethylaminopropanol, dissolved in 1 liter of chloroform, were slowly added. The flask was then heated slightly on a water bath for 1 to 2 hours, after which the solvent was removed by evaporation, the residue was dissolved in a small amount of water, sodium carbonate in excess was slowly incorporated, it was extracted with ether and finally dried by means of sodium sulfate and the ether evaporated. The dried residue of the ethereal solution was then distilled under reduced pressure. It was found that the resulting product boiled at about 99° to 101° C. under a pressure of 13 to 14 mm. of mercury. The structure of this compound was found to be $C_2H_5$—CO—O—$(CH_2)_3$—$N(C_2H_5)_2$. It was found that, when 0.15 per cent of this product was added to olive oil, stabilization was obtained.

Example 2

120 grams of n-butyryl chloride were dissolved in 400 cc. of chloroform and this solution was placed in a flask. A solution of 120 grams of diethyl-amino-ethanol in 300 cc. of chloroform was gradually added. The same procedure, outlined in Example 1, was then followed for the purpose of isolating the resulting anti-oxidant compound. The latter was found to have the formula $C_3H_7$—CO—O—$(CH_2)_2$—$N(C_2H_5)_2$ and a boiling point of 98° to 100° C. under a pressure below 14 mm. of mercury. This product was found to be an effective antioxidant.

Example 3

200 grams of p-hydroxybenzoic acid and 250 grams of trimethylene glycol were mixed and heated on a water bath, under a reflux condenser for 8 hours, while gaseous HCl was passed into the mixture. The product obtained was poured into cold water, neutralized with sodium carbonate and washed with water several times. 200 grams of this product were then heated in admixture with 200 grams of diethylamine to a temperature of 108° to 112° C., under pressure, and for a period of 1½ hours. The reaction product was shaken with 500 cc. of benzol and an equal amount of 10 per cent hydrochloric acid, the two layers were separated, the aqueous acid solution was neutralized with sodium carbonate and the reaction product was extracted by shaking with ether. After drying the ether extract by means of sodium sulfate, gaseous HCl was introduced, which caused the precipitation of the reaction product in crystalline form. This crystalline precipitate was dissolved in a small amount of water, neutralized with sodium carbonate and again extracted with ether. The ether extract was then evaporated. The residue was found to have the formula HO—$C_6H_4$—CO—O—$(CH_2)_3$—$N(C_2H_5)_2$. This compound has a melting point of 104° to 105° C. When this compound is dissolved in arachis oil, in a concentration of 0.15 per cent, the oil is stabilized.

Example 4

550 grams of m-methoxybenzoic acid chloride were dissolved in 2½ liters of chloroform. This solution was reacted with 400 grams of gamma-diethylaminopropanol, the reaction product being recovered by the treatment described in Example 1. The resulting product was found to have a boiling point of 193° to 194° C. under a pressure of from 12 to 13 mm. of mercury. When 0.4 per cent of this product, having a formula of $CH_3O-C_6H_4-CO-O-(CH_2)_3=N(C_2H_5)_2$ was dissolved in freshly pressed linseed oil, stabilization of the oil was obtained.

A large number of other closely related products can be made by slight variations of the processes of the above specific examples, all of which products possess anti-oxidant properties. Thus, it is possible to produce products in which the group $R_1$ of the above general formula represents a naphthyl group which may be substituted, a substituted or unsubstituted pyridyl group, an amino-substituted phenyl group etc. The nitrogen atom of the formula may be substituted with one or two alkyl groups, such as methyl, ethyl, propyl or butyl groups.

The quantities of the above compounds, which are required to produce stabilization of products subject to oxidation will vary, of course, with the products to be stabilized and with the compounds employed to produce stabilization. This will also vary with the conditions of storage, for example, the temperature, exposure to light, access of air and other conditions. But as a rule it may be said that substantial stabilization of most products can be obtained by the use of concentrations of up to 1 per cent by weight of the new anti-oxidants.

It is evident, from the above specific examples, that the anti-oxidants used in the present invention can be made by reacting acid chlorides with mono- or di-alkylated-amino-alcohols, or by the reaction of acid-halogen-alkyl-esters with primary or secondary alkyl amines. The acid-halogen-alkyl-esters can be produced readily by reacting carboxylic acids with alkalene-dioles in the presence of a gaseous, hydrogen halide. It is, of course, evident that other methods can be employed for making the compounds used in the present invention. Other variations of the present invention, which fall within the scope of the following claims, will be immediately evident to those skilled in this art.

What we claim is:

1. In the stabilization of animal and vegetable fats and oils subject to deterioration by oxidation, the process which comprises adding to such a product in a quantity sufficient to prevent oxidation thereof, a compound represented by the general formula

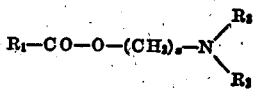

wherein $R_1$ represents a substituent selected from the class consisting of hydrogen, alkyl, alkylene, aryl, hydroxyaryl, alkoxyaryl and aminoaryl groups, $R_2$ represents an alkyl group containing no more than 3 carbon atoms, $R_3$ represents a substituent selected from the class consisting of hydrogen and alkyl groups having no more than 3 carbon atoms and $x$ is an integer varying from 1 to 4.

2. The process of claim 1 wherein the product to be stabilized is arachis oil.

3. The process of claim 1 wherein the product to be stabilized is linseed oil.

4. In the stabilization of animal and vegetable fats and oils subject to deterioration by oxidation, the process which comprises adding to such a product a small amount of the compound $C_2H_5-CO-O-(CH_2)_3-N(C_2H_5)_2$ in a quantity sufficient to prevent oxidation thereof.

5. As a new composition of matter, a product of the class consisting of animal and vegetable fats and oils normally tending to deteriorate on standing due to auto-oxidation, said product being stabilized by the presence of a compound in a quantity sufficient to prevent oxidation thereof represented by the general formula

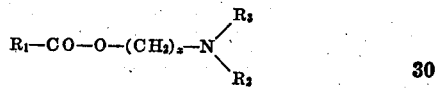

wherein $R_1$ represents a substituent selected from the class consisting of hydrogen, alkyl, alkylene, aryl, hydroxyaryl, alkoxyaryl and aminoaryl groups, $R_2$ represents an alkyl group containing no more than 3 carbon atoms, $R_3$ represents a substituent selected from the class consisting of hydrogen and alkyl groups having no more than 3 carbon atoms and $x$ is an integer varying from 1 to 4.

6. In the stabilization of animal and vegetable fats and oils subject to deterioration by oxidation, the process which comprises adding to such a product the compound

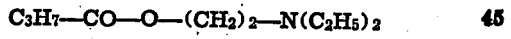

in a quantity sufficient to prevent oxidation thereof.

7. In the stabilization of animal and vegetable fats and oils subject to deterioration by oxidation, the process which comprises adding to such a product the compound

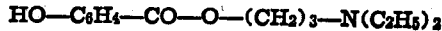

in a quantity sufficient to prevent oxidation thereof.

THEODOR SABALITSCHKA.
ERICH BÖHM.